Jan. 16, 1962 G. P. DIEDRICH 3,016,848
SELF-SERVICE BANK DEPOSIT RECEIVER
Filed Jan. 25, 1961 2 Sheets-Sheet 1
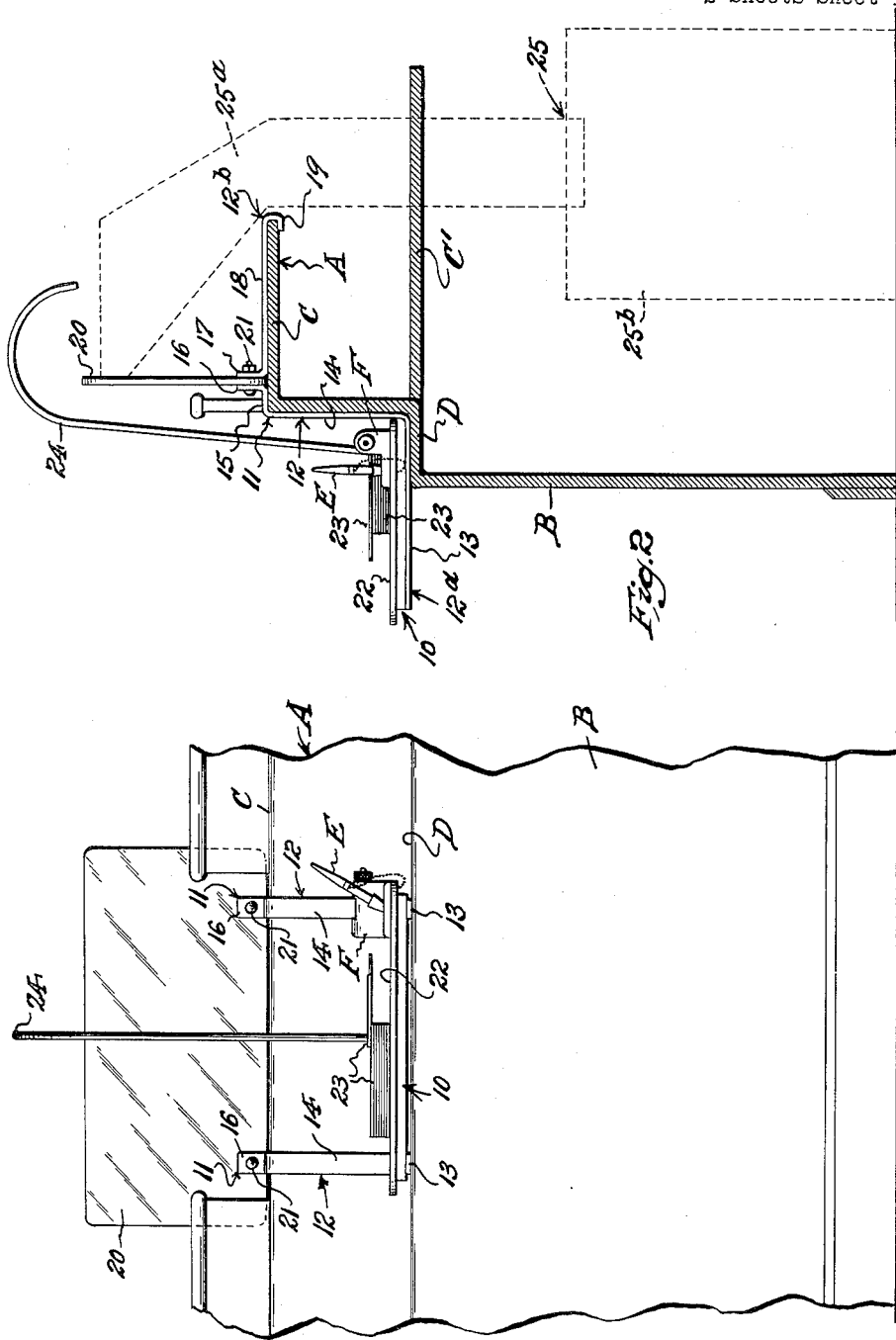
INVENTOR.
George P. Diedrich,
BY
Richards and Cifelli,
Attorneys

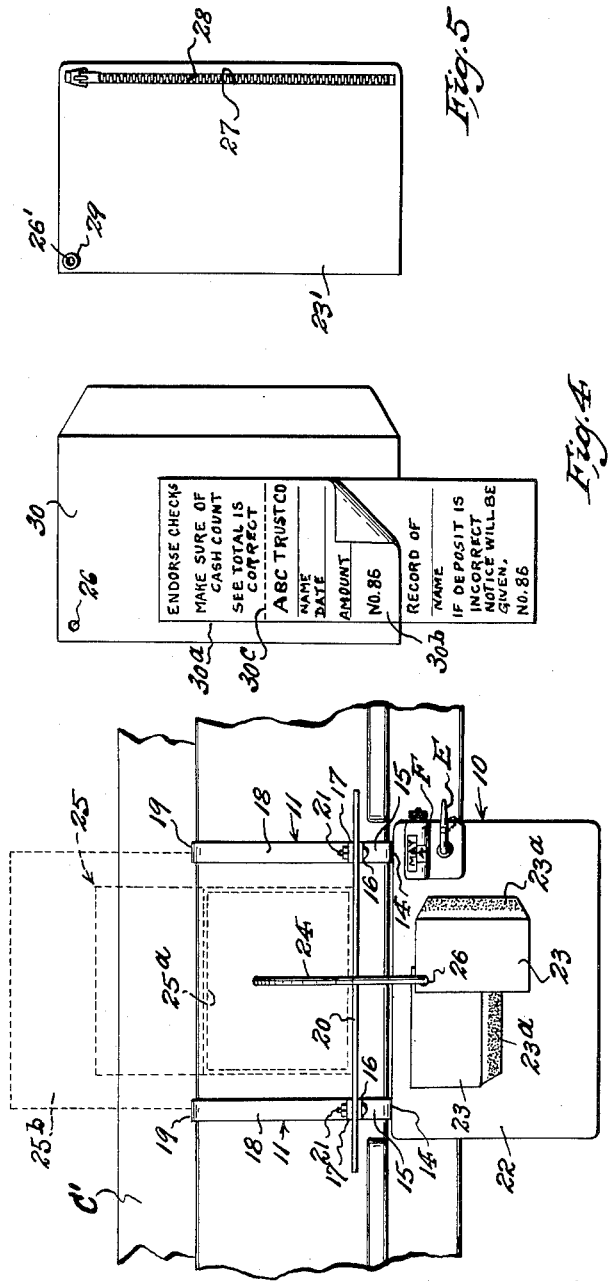

United States Patent Office 3,016,848
Patented Jan. 16, 1962

3,016,848
SELF-SERVICE BANK DEPOSIT RECEIVER
George P. Diedrich, 361 Ridgewood Blvd. N.,
Westwood, N.J.
Filed Jan. 25, 1961, Ser. No. 84,898
9 Claims. (Cl. 109—23)

This invention relates in general to bank appliances for the implementation of business procedures, and has particular reference to mechanical devices which may be operated by a depositor in substitution for a receiving teller to receive and secure deposits of checks and cash.

It often happens that a bank customer will find long lines waiting at all windows or stations manned by receiving tellers when he goes to his bank on pay days or on other days when deposits are at a peak. My proposed invention is a mechanical bank deposit receiver adapted to be installed at a special window or counter station where a customer who does not desire to await his turn in line at the manned windows or stations can attend to all the necessary details of making a deposit, to include placing the deposit under the secure control of the bank, without the aid of a teller.

I am aware that there are in the prior art a number of machines capable of receiving self-service deposits, but they are all massive, heavy, extremely complicated in construction and mode of operation, and correspondingly expensive.

It, therefore, is the primary object of my present invention to provide a self-service bank deposit receiver that, instead of being a machine, is a simple device comprising very few parts which can be temporarily installed at any unoccupied station along a teller's counter to meet the exigencies of business traffic.

Other objects, advantages and features of the invention will become apparent as the following specific description is read in connection with the accompanying drawing, in which:

FIG. 1 is a front elevation, partly broken away, of the teller's counter in a bank, showing the improved self-service bank deposit receiver installed thereon;

FIG. 2 is a vertical cross-sectional view of the same;

FIG. 3 is a plan view, showing the uppermost deposit container envelope of a stack arranged in position to receive a money deposit accompanied by a formal deposit record slip;

FIG. 4 is a detail plan view of a deposit slip peculiarly suited to use in connection with the receiver; and, FIG. 5 is a plan view of a modified deposit container in the form of a plastic envelope having a zippered side wall slit.

Referring now in detail to the drawings, wherein like reference characters designate corresponding parts in the several views, FIGS. 1 to 3, inclusive, represent an embodiment of the invention designed for installation on a teller's counter A, as a whole, of standard construction, which includes a front wall B surmounted by the level service counter proper C and having a customer's ledge D on the front, or outside, at a height convenient for use in supporting a lady's handbag, or other articles, to free the hands for handling the deposit slip and checks or cash accompanying the slip. A teller's work counter C' is located beneath the level of teller's service counter C in rear of front wall B.

The self-service bank deposit receiver 10 includes as the basic component of its construction a frame 11 shaped to fit evenly against the front wall B, counter proper C and customer's ledge D of the exemplary teller's counter A in a manner to rigidly support the functional components of said receiver to be described in detail presently. Although I do not intend to be limited to any specific construction of frame 11, that suggested in the accompanying drawings is considered to be sufficiently strong and capable of ready attachment and detachment, as required, while possessing the virtues of extreme simplicity and low cost.

To be more explicit, the presently preferred form of frame 11 comprises a pair of substantially identical side elements 12—12 which are adapted to be laterally spaced at an appropriate interval in their application to teller's counter A. These side elements 12—12 perferably are made of strap metal, which can conveniently be bent into the shapes desired for conformity to the contours of counter A, and each of said side elements is divided into two sections, viz. a front section 12a and a rear section 12b. Front frame section 12a includes a long horizontal desk-supporting arm 13 adapted to rest upon customer's ledge D, a vertical riser 14 to abut front wall B of teller's counter A above said ledge, a short rearwardly extending counter-supported arm 15, and an upright rear end portion 16 that rises above counter proper C for a short distance. Rear frame section 12b includes an upright front end portion 17 that matches rear end portion 16 of front frame section 12a in height, a rearwardly extending horizontal portion 18 that rests upon counter proper C, and a depending hook portion 19 to engage the rear edge of said counter proper.

A security shielding partition 20 rising above counter proper C to a suitable height for security purposes is clamped between the respective upright rear and front end portions 16 and 17 of front and rear frame sections 12a and 12b by means of bolts, or the like, 21 that pierce said portions 16 and 17. Security shielding partition 20 preferably is made of glass or other transparent material and is of sufficient width and height to shield the region of the teller's private domain immediately in rear thereof from access by a customer or other person standing in front thereof in the customer's lobby. The dimensions of security shielding partition 20 also should be such that it will fit within the framework of a teller's window whenever the self-service bank deposit receiver 10 is to be installed in a bank having the less modern window-type counter construction.

A flat shelf-like writing desk 22 is mounted upon the forwardly projecting horizontal arms 13—13 of front section 12a of frame elements 12—12 and is secured to the said arms by suitable means. This desk 22 is intended for use by a customer in making entries on the deposit slips to be inserted in deposit containers 23 provided by the bank for the customers' use.

Projecting upwardly from the writing desk 22 substantially midway between the side edges thereof and near the rear edge is a rod-like security guide member 24 of resilient material, such as metal or plastic, which has its base end affixed to said desk. This security guide member projects upward to a height exceeding that of security shielding partition 20 and has its upper end portion free and bent rearward to encompass the upper edge of said security shielding partition with said free end pointing obliquely downward in rear of the latter toward a receptacle 25 for deposit containers 23.

Receptacle 25 may take several forms, such as a simple open-top box (not shown) resting upon counter proper C, or upon teller's work counter C' safely in rear of security shielding partition 20, or the device represented in FIG. 2, which includes a substantially vertical chute 25a and an open-top floor-supported box 25b into which said chute empties. Chute 25a may be supported by security shielding partition 20, counter proper C or work counter C' of teller's counter A, or box 25b, whichever may be preferred.

The deposit containers 23 shown in FIG. 3 are consecutively numbered flat paper envelopes having closure flaps 23a coated with adhesive material. At one corner of each container 23 there is a through hole 26 through which security guide member 24 is threaded. Hole 26 should be large enough in diameter to permit the deposit container 23 to slide freely on security guide member 24.

For the convenience of customers, a pen with holder E and a calendar F are shown mounted on writing dask 22.

In FIG. 5 there is shown a modified deposit container 23' in the form of a transparent plastic envelope having a longitudinal slit 27 along one side edge which is closed by a slide-fastener, or "zipper," device 28 of conventional construction. The corner-located through hole 26' may be rendered more durable and free-sliding by the addition of a metal eyelet or grommet 29.

FIG. 4 represents a combination deposit container and slip 30 provided for use with my improved self-service bank deposit receiver 10. This deposit container and slip 30 includes a suitably imprinted body portion 30a and an overlying customer's copy 30b which may be torn off along a line of perforations 30c. The customer's copy 30b should be made of the new non-carbon or self-carbon paper that automatically transfers the impression of the customer's pen or pencil notations to the underlying body portion 30a. With this feature, only the money deposit need be enclosed in the container.

The manner in which my invention is used for self-service deposits will now be described.

When a bank customer enters the lobby of a bank equipped with the self-service bank deposit receiver at one or more unmanned stations of the teller's counter A and finds long lines of depositors at the manned stations, he fills out his usual deposit slip at the regular depositors table and proceeds to a self-service station. There he can use desk 22 to fill out a special deposit record, or receipt slip, in duplicate. He then inserts his usual deposit slip, the checks and/or cash constituting his deposit, and the duplicate of the record of deposit in the top one of a stack of deposit containers 23, which he will find lying on desk 22 and threaded on security guide member 24. He retains the original receipt slip as his record of deposit. After closing the container 23 by closing the self-sealing flap 23a (FIG. 3 embodiment) or closing the slide-fastener 28 (FIG. 5 embodiment), the customer slides the deposit-containing container 23 upward along security guide member 24 until it has passed over the top of security shielding partition 20 and is engaged with the downwardly directed free end portion of said security guide member. At this point, he may release the deposit container to permit it to slide irretrievably downward and off the free end of security guide member 24 into the receptacle 25.

The desirable end result of use of the self-service bank deposit receiver 10 is to transfer a deposit-loaded container 23 from the region of writing desk 22 in the public lobby safely and with necessary security over the top of security shielding partition 20 into a receptacle in the teller's domain where it is safe from being tampered with by the customer who performed the act of making a deposit or any other "outsider." Only bank employees can thereafter have access to the deposit. Deposits may in some cases fall into a closed container (not shown) to be opened only under dual control, that is, two persons necessary to remove deposits from the container for internal audit reasons.

After a deposit by this method has been checked at a convenient time by a receiving teller, the depositor can be notified of any error, such as variance between the amount of check and cash contained in deposit container 23 and the sum entered on the enclosed deposit slip. Also, if a passbook system is in effect, the customer's passbook may be returned to him by mail.

While the invention has been illustrated and described with respect to a particular embodiment thereof, it will be understood that it is intended to cover all changes and modifications of the embodiment shown which do not constitute departures from the spirit of the invention and scope of the appended claims.

I claim:

1. A self-service bank deposit receiver comprising: a frame constructed and arranged to be attached to the teller's counter of a bank; a security shielding partition supported fixedly by said frame and projecting upward from the front of said counter; a shelf-like writing desk supported by said frame at a position in front of said counter; a rod-like security guide member having one end affixed to said writing desk and projecting upwardly therefrom to a height exceeding that of said security shielding partition, said security guide member having its upper end portion free and bent rearward to encompass the upper edge of said security shielding partition and point obliquely downward in rear of the latter; and at least one deposit container having a through hole through which said security guide member is threaded loosely, whereby said container after a deposit has been placed therein may be slid upward along said security guide member and over the top of said security shielding partition into a shielded and secured region.

2. A self-service bank deposit receiver as defined in claim 1, wherein the deposit container is an envelope including sealing means.

3. A self-service bank deposit receiver as defined in claim 2, wherein the through hole is located in one corner of the deposit container.

4. A self-service bank deposit receiver as defined in claim 1, to which is added a receptacle for deposit containers located in rear of the security shielding partition in alignment with and beneath the free end of the security guide member.

5. A self-service bank deposit receiver as defined in claim 4, wherein the receptacle for deposit containers is an open-top receptacle.

6. A self-service bank deposit receiver as defined in claim 1, to which is added a receptacle for deposit containers located in rear of the security shielding partition in alignment with and beneath the free end of the security guide member, said receptacle including a downwardly and rearwardly projecting chute and a box located beneath said chute.

7. A self-service bank deposit receiver as defined in claim 1, wherein the security guide member is made of resilient metal.

8. A self-service bank deposit receiver as defined in claim 1, wherein the security shielding partition is made of transparent material.

9. A self-service bank deposit receiver as defined in claim 1, wherein the frame is formed from bendable strap material and comprises a pair of substantially identical side elements which are laterally spaced and shaped to conform to the contour of a conventional bank teller's counter including a vertical front wall, counter proper surmounting said front wall, and a customer's ledge formed in said front wall, each of the side elements of the frame being divided into a front section and a rear section of which the front section includes a long horizontal desk-supporting arm adapted to rest upon the customer's ledge, a vertical riser to abut the front wall of the counter, a short rearwardly extending counter-supported arm, and an upright rear end portion that rises above the counter proper for a short distance, and of which the rear section includes an upright front end portion that matches the rear end portion of the front frame section in height, a rearwardly extending horizontal portion that rests upon the counter proper, and a depending hook portion to engage the rear edge of said counter proper, and wherein the base edge of the security shielding partition is clamped between the respective upright rear and front end portions of the front and rear frame sections.

References Cited in the file of this patent
UNITED STATES PATENTS

| | | |
|---|---|---|
| 353 | Fitzgerald | Aug. 15, 1837 |
| 1,635,736 | Banta | July 12, 1927 |
| 2,144,564 | Portman-Dixon | Jan. 17, 1939 |